(12) United States Patent
Demma et al.

(10) Patent No.: US 6,570,377 B1
(45) Date of Patent: May 27, 2003

(54) SYSTEMS AND METHOD FOR DETERMINING PROXIMITY SENSOR CHARACTERISTICS

(75) Inventors: Nick A. Demma, Minneapolis; Michael R. Elgersma, Plymouth, both of MN (US); LeRoy E. Vetsch, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 92 days.

(21) Appl. No.: 09/677,196

(22) Filed: Oct. 2, 2000

(51) Int. Cl.[7] .............................. G01B 7/14; G01R 27/26
(52) U.S. Cl. .......................... 324/207.26; 324/207.12; 324/652; 324/655
(58) Field of Search .................. 324/207.26, 207.16, 324/207.12, 207.15, 207.24, 228, 225, 234, 239, 240, 652, 655

(56) References Cited

U.S. PATENT DOCUMENTS

| | | | | |
|---|---|---|---|---|
| 4,219,740 A | | 8/1980 | Little | 307/116 |
| 5,036,236 A | * | 7/1991 | Wilson | 310/90.5 |
| 5,065,093 A | * | 11/1991 | Nauta et al. | 324/207.12 |
| 5,180,978 A | * | 1/1993 | Postma et al. | 324/207.16 |
| 5,187,475 A | | 2/1993 | Wagener et al. | 340/870.32 |
| 5,410,488 A | | 4/1995 | Andersen, III | |
| 5,506,506 A | | 4/1996 | Candy | |
| 5,691,639 A | * | 11/1997 | Demma et al. | 324/207.26 |

* cited by examiner

Primary Examiner—Jay Patidar
Assistant Examiner—Reena Aurora
(74) Attorney, Agent, or Firm—Dennis C. Bremer

(57) ABSTRACT

A system and method for determining characteristics of a proximity sensor. According to a preferred embodiment, the admittance of a proximity sensor/cable assembly is measured at two frequencies. Assumptions about sensor characteristics and cable characteristics are made, and an admittance corresponding to the assumed characteristics is derived. The assumptions are adjusted to obtain a correspondence between the measured admittance and the derived admittance. When the assumptions have been updated a specified number of times or when a desired accuracy threshold has been met, the adjusted assumptions may be used to determine one or more sensor characteristics, such as the separation between the proximity sensor and the target object.

15 Claims, 4 Drawing Sheets

SYSTEMS AND METHOD FOR DETERMINING PROXIMITY SENSOR CHARACTERISTICS

FIELD OF THE INVENTION

The present invention relates to proximity sensors. More particularly, the present invention relates to a system and method for compensating for the effects of a cable used with a proximity sensor.

BACKGROUND OF THE INVENTION

U.S. Pat. No. 5,180,978 of Postma et al. issued Jan. 19, 1993 and assigned to the assignee of the present invention (hereinafter the '978 patent), describes a two wire proximity sensor having a sensing coil movable into proximity with a metal member or target and provides for the direct measurement of the AC and DC resistances of the coil and, in one embodiment the imaginary impedance component (i.e., the reactance). A microprocessor utilizes these values and provides an output indicative of the distance between the coil and the target. The measurement of the distance to the target affects the difference between the AC resistance and the DC resistance and this difference does not vary much with temperature. Since the wire has equal values of AC resistance and DC resistance, the effect of the wire is cancelled by taking the difference of these two resistances.

One difficulty has been encountered in the use of the invention of the '978 patent and that occurs when the lengths of the wires to and from the sensor become long enough that the capacitance introduced thereby causes phase shifts which prevent the measurement of the AC resistance of the sensor. Although using low frequency can minimize this effect, attempts to make this effect extremely small motivate the use of a frequency so low that the eddy currents in the metal target no longer produce the desired change in the AC resistance. Aircraft manufacturer requirements have been changed from requiring plus or minus 1.0 mm accuracy to requiring an accuracy of plus or minus 0.1 mm and to requiring that the measurement be insensitive to temperature between 77° C. to +125° C. with cable lengths of 3 m to 80 m in an unshielded twisted pair.

A preferred embodiment of the present invention overcomes some of the problems associated with the new accuracy requirements and allows great accuracy over extreme cable length variations with minimal problems with noise, sensor temperature variations, and capacitance. The basic change over the prior systems is to measure the admittance of a proximity sensor and an interposed transmission cable. Assumptions about sensor characteristics and cable characteristics are made, and an admittance corresponding to the assumed characteristics is derived. The assumptions are adjusted to obtain a correspondence between the measured admittance and the derived admittance. When the assumptions have been updated a specified number of times or when a desired accuracy threshold has been met, the adjusted assumptions may be used to determine sensor characteristics, such as the separation between the proximity sensor and the target object.

BRIEF DESCRIPTION OF THE DRAWINGS

Preferred embodiments of the present invention are described with reference to the following drawings, wherein.

DETAILED DESCRIPTION

System for Determining Characteristics of a Proximity Sensor

Figure 1:
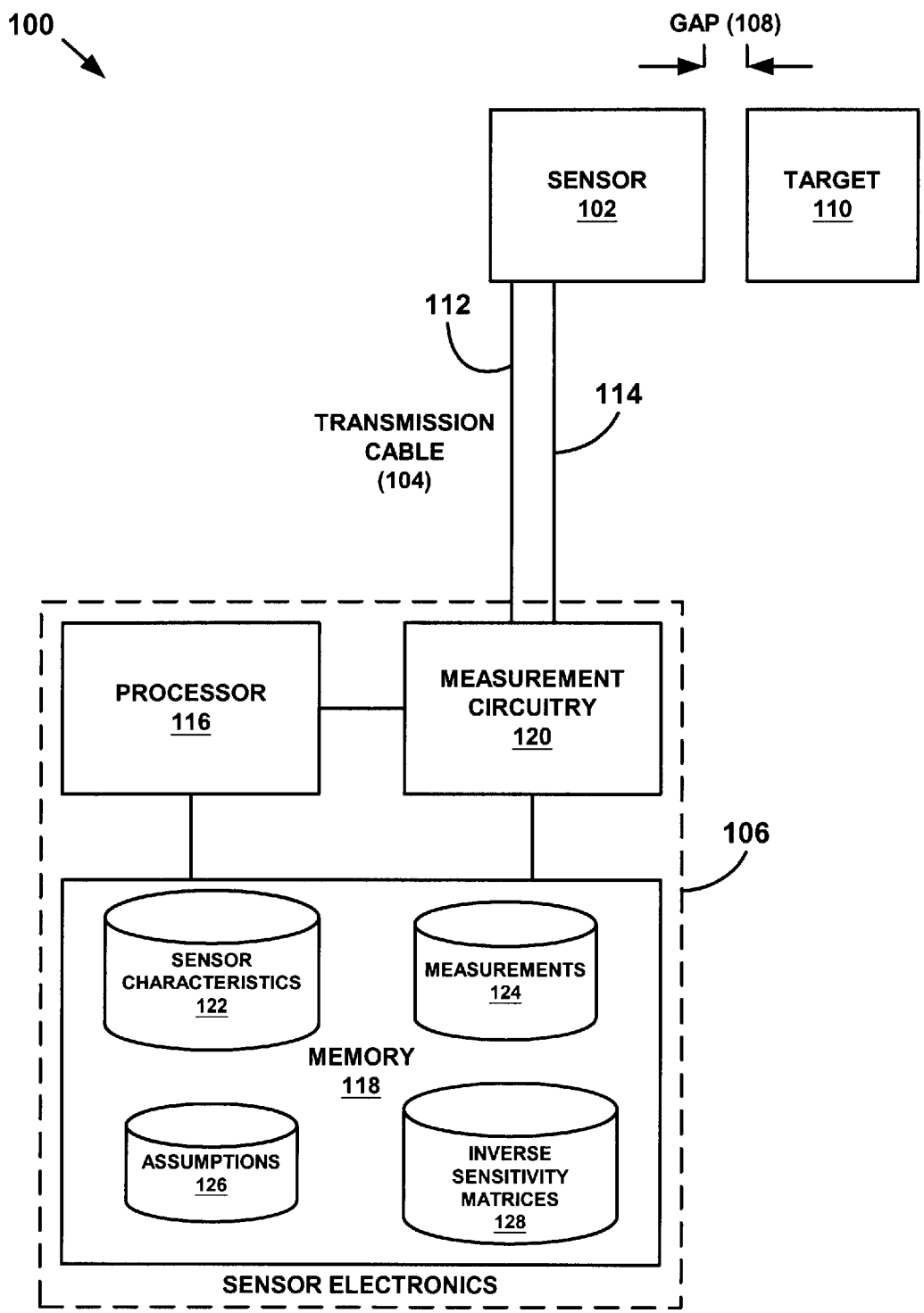
FIG. 1 is a simplified block diagram illustrating a system for determining characteristics of a proximity sensor, according to an embodiment of the present invention.

FIG. 1 is a simplified block diagram illustrating a system 100 for determining characteristics of a proximity sensor according to an embodiment of the present invention. The system 100 includes a sensor 102, a transmission cable 104, and sensor electronics 106. Other components may also be included within the system 100, depending on the particular application and implementation. The cable 104 connects the sensor 102 to the sensor electronics 106, and enables proximity measurements to be taken at a site that is at a distance (e.g. up to 80 meters) from the sensor electronics 106. The sensor 102, the cable 104, and the sensor electronics 106 may be used to measure a gap 108 separating the sensor 102 from a target object 110. The gap 108 represents the distance separating the sensor 102 from the target 110. A typical measurable gap is 0 to 6 millimeters.

The sensor 102 may a coil-based sensor, such as the sensor described in commonly assigned U.S. Pat. No. 5,180,978. Other implementations for sensor 102 may also be used without departing from the intended scope of the present invention.

The cable 104 preferably includes at least two wires 112 and 114. The cable 104 has various parameters associated with it, such as the resistance (R) per meter of the cable, the inductance (L) per meter of the cable, the conductance (G) per meter of the cable's dielectric, and the capacitance (C) per meter of the cable. The values for C and L typically depend on the type of wire that is used in the cable 104. The value of R typically depends on the type of wire used and the temperature of the wire. For many applications, such as for use on aircraft, the type of wire will be known, and thus C and L are not likely to vary appreciably.

The sensor electronics 106 may differ depending on the particular intended application of use. The sensor electronics 106 preferably include a processor 116, a memory 118, and measurement circuitry 120. These may be discreet components, or they may be combined. Many other components may also be included, such as analog-to-digital converters, digital-to-analog converters, comparators, filters, buffers, inverters, oscillators, and voltage sources.

The processor 116 may be a commercially available or proprietary processor operable to control, access, and/or modify the memory 118 and the measurement circuitry 120. The processor 116 may, for example, be one or more microcontrollers. A commercially available or proprietary operating system and one or more applications may assist the processor 116 in performing its functions. The operating system and/or application(s) may be implemented as software, firmware, and/or hardware, and may be stored in the processor 116, in the memory 118, or in a separate data storage location within or outside of the sensor electronics 106.

The memory 118 may be used to store one or more databases such as a sensor characteristics database 122, a measurement database 124, an assumptions database 126, and an inverse sensitivity matrices database 128. One or more of these databases, may be replaced by a real-time calculation system. In addition, as an alternative to storing data in databases, some types of data (such as measurement data) may instead be stored in a temporary buffer memory. The memory 118 may be used by the processor 116 and/or the measurement circuitry 120 to store data while determining characteristics of the sensor 102.

The sensor characteristics database 122 preferably consists of four 2-dimensional tables, with two of the tables corresponding to sensor characteristics at a first measurement frequency and the other two tables corresponding to sensor characteristics at a second measurement frequency. In particular, the first two tables include entries corresponding to the admittance of the sensor at the first frequency. Because admittance is represented as a complex number consisting of a real part (the conductance G) and an imaginary part (the susceptance B), one table will contain entries for G1 (the sensor conductance at the first frequency) while a second table will contain entries for B1 (the susceptance at the first frequency). Similarly, for the second frequency, the first table will contain entries for G2 (the conductance at the second frequency), and the second table will contain entries for B2 (the susceptance at the second frequency). The four tables G1, B1, G2, and B2 are two-dimensional tables that preferably have the sensor temperature as a first dimension and the gap between the sensor 102 and the target 110 as a second dimension. As a result, for any typical combination of sensor temperature and gap, the tables should provide the admittance of the sensor 102 at the first frequency or the second frequency. In an exemplary embodiment, the first frequency is 2 kHz and the second frequency is 6 kHz. Other frequencies may also be used. If it is known that the proximity sensor will be used in an environment in which the temperature and/or gap does not depart from a certain range of temperatures and/or gaps, then the admittance tables may be limited to these ranges. In one embodiment, the tables include admittance entries having units of Siemens for various values of temperature and gap. Temperature may be represented as degrees Kelvin and the gap may be represented as meters. The sensor characteristics database 122 may be implemented as one or more look-up tables. The sensor admittance values stored in the sensor characteristics database 122 represent the admittance of the sensor alone, without admittance effects due to an interposed cable, such as the cable 104. The sensor characteristics database 122 may be compiled by connecting the measurement circuitry 120 directly to the sensor 102, so that admittance effects due to the cable 104 are removed. By placing the sensor in a precisely controlled oven, admittance measurements can be taken for various sensor temperatures and various gaps 108.

The measurements database 124 may be used to store measurements taken by the measurement circuitry 120 during normal operation. The measurements database 124 preferably is used to store measured admittance attributes (including effects due to the cable 104) taken at two frequencies. Thus, a first measured admittance attribute may be taken at a first frequency, and a second measured admittance attribute may be taken at a second frequency. The first and second measured admittance attributes may then be stored in the measurements database 124. The first measured admittance attribute consists of a first measured conductance attribute and a first measured susceptance attribute. The second measured admittance attribute consists of a second measured conductance attribute and a second measured susceptance attribute. The frequencies used to obtain the measured admittance attributes are preferably chosen to be the same as the frequencies used in the sensor characteristics database 122. In an exemplary embodiment, the first frequency is 2 kHz and the second frequency is 6 kHz.

The assumptions database 126 may be included to store one or more operating parameter assumptions and/or one or more adjusted operating parameter assumptions. These assumptions may be used by the processor 116 to assist in determining characteristics of the sensor 102, as will be described with reference to FIGS. 3 and 4. The operating parameter assumptions preferably include sensor parameter assumptions and cable parameter assumptions. The sensor parameter assumptions include a gap parameter assumption and a temperature parameter assumption. The cable parameters include a length parameter assumption and a resistance parameter assumption. Other parameter assumptions other than those described herein may also be used without departing from the intended scope of the present invention. The parameters used for the sensor parameter assumptions should correspond to the sensor characteristics parameters used in the sensor characteristics database 122 (i.e., the sensor temperature and the gap). The cable parameters refer to the parameters of the cable 104. The operating parameter assumptions stored in the assumptions database 126 may be used in conjunction with the entries stored in the sensor characteristics database 122, the values stored in the measurements database 124, and the entries from the inverse sensitivity matrices database 128 to obtain the adjusted operating parameter assumptions. Through an iteration process described in further detail with reference to FIGS. 3 and 4, the operating parameter assumptions may be adjusted a specified number of times or until the characteristics of the proximity sensor are determined to within a desired accuracy threshold.

The inverse sensitivity matrices database 128 includes a plurality of matrices that may be used to obtain the adjusted operating parameter assumptions stored in the assumptions database 126 or elsewhere. In the preferred embodiment, each inverse sensitivity matrix is a 4×4 matrix that is the inverse of a corresponding 4×4 sensitivity matrix. The sensitivity matrix may or may not be stored, and contains entries representing the sensitivity of the admittance at two frequencies (G1', B 1', G2', and B2') of the combined sensor/cable assembly to changes in sensor characteristics and cable characteristics. The sensitivity matrix preferably contains 16 entries corresponding to the sensitivity of G1', B1', G2', and B2' to changes in the temperature of the sensor 102, the gap 108, the resistance of the cable 104, and the length of the cable 104. A plurality of matrices are included within the inverse sensitivity matrices database 128 because, due to non-linearities, the entries contained in each matrix will likely differ depending on the values of the sensor parameters and cable parameters. In an alternative embodiment, inverse sensitivity matrices are calculated "on-the-fly" in contrast to being stored in a database. Sensitivity matrices, inverse sensitivity matrices, and the inverse sensitivity matrices database 128 will be described in further detail with reference to FIGS. 3 and 4.

The measurement circuitry 120 may be used to obtain measurements of the admittance of the sensor 102 as affected by the cable 104. The measurement circuitry 120 may also be used to obtain measurements of the sensor 102 alone, to assist in compiling the sensor characteristics database 122. The processor 116 may be used to control the measurement circuitry 120. Alternatively, other control means may also be used. The measurement circuitry 120 preferably drives one wire 112 with a sinusoidal voltage source and makes measurements on the other wire 114. Measurements are preferably taken at frequencies corresponding to the first and second frequencies described with reference to the sensor characteristics database 122, the measurements database 124, and the inverse sensitivity matrices database 128.

Figure 2:
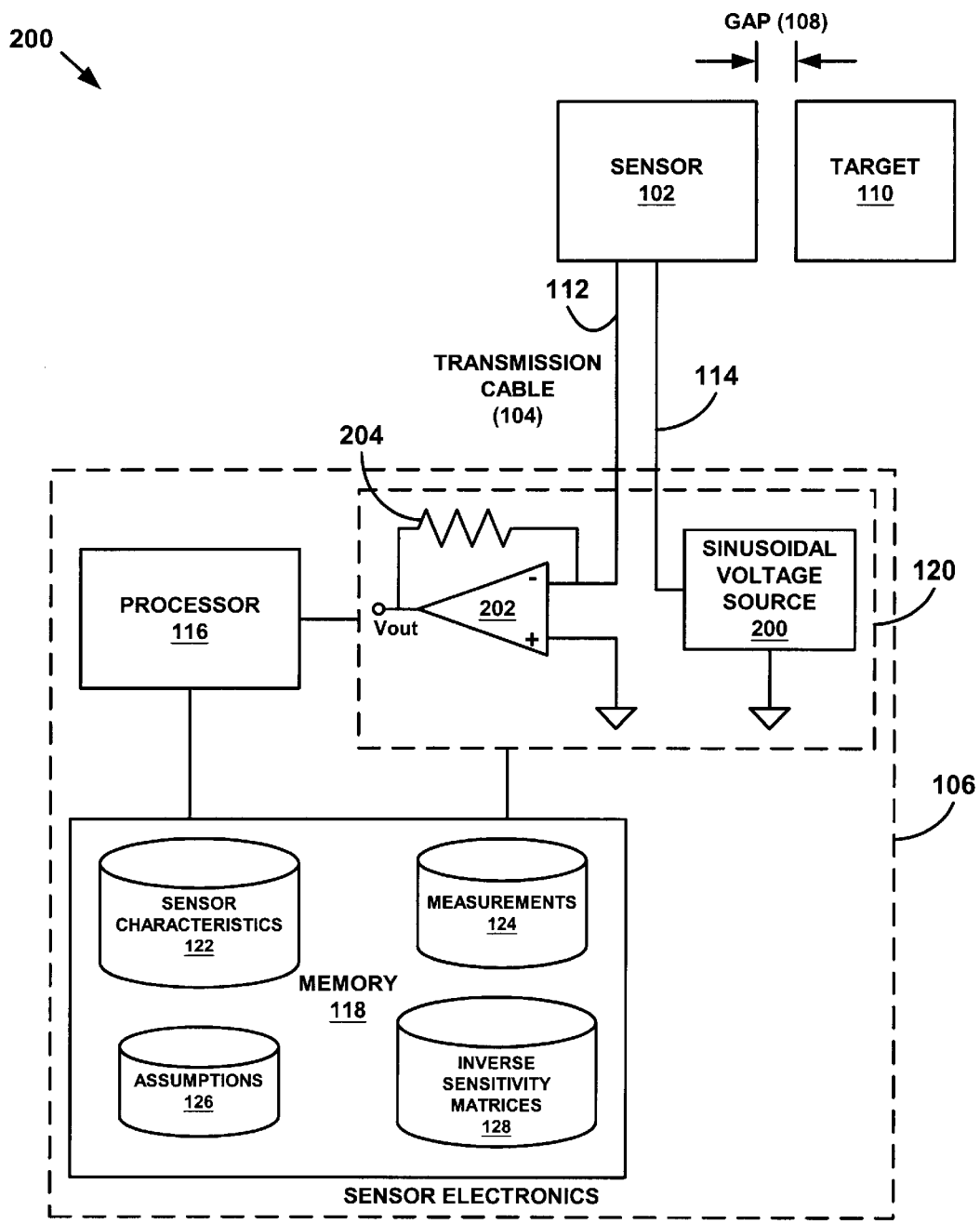
FIG. 2 is a simplified block diagram illustrating a system for determining characteristics of a proximity sensor, according to a preferred embodiment of the present invention.

FIG. 2 is a simplified block diagram illustrating the system 100 according to a preferred embodiment of the present invention. The measurement circuitry 120 is shown to include a sinusoidal voltage source 200 to drive wire 114 of the cable 104. Wire 112 of cable 104 is connected to the virtual ground of an operational amplifier 202. A resistor 204 provides impedance on a negative feedback path to the operational amplifier 202. In a preferred embodiment, the value of the resistor 204 is 100 Ohms. Although the voltage source 200 and operational amplifier 202 are shown without connections to the processor 116 and the memory 118, this is merely to maintain simplicity in the block diagram. Thus, the measurement circuitry 120 containing the voltage source 200 and operational amplifier 202 is shown as having connections to the processor 116 and to the memory 118. For example, the processor 116 may be used to control the voltage source 200 to specify the frequency and/or voltage provided by the voltage source 200. Similarly, the processor 116 may assist in receiving the output from the operational amplifier 202 and may assist in storing one or more measured admittance attributes in the memory 118, such as in the measurements database 124. Other implementations of the measurement circuitry 120 may be used instead of or in addition to what is shown in FIG. 2. Similarly, other control and/or storage mechanisms may be used other than the processor 116 and the memory 118.

Because the voltage source 200 is preferably a sinusoidal voltage source, the capacitance between wire 114 and ground has little effect on the admittance measurements. Similarly, the capacitance between the wire 112 and ground has little effect on the admittance measurements because the operational amplifier 202 holds the end of wire 112 near ground potential. Capacitance between the wires 112 and 114 is accounted for during a separate processing step, to be described later, by utilizing an equation that describes the cable as a transmission line. The voltage output of the operational amplifier 202 may be synchronously demodulated using lock-in-amplifier techniques phase-sensitive demodulation to produce values of the conductance, G, and susceptance, B, to give the complete admittance, G+jB. This phase-sensitive demodulation includes measuring the amplitude and phase for both the in-phase and quadrature components of the sine wave. When this is done at two frequencies, the following attributes are obtained: G1', B1', G2', and B2', representing the admittance of the sensor/cable assembly at two frequencies.

Method for Determining Characteristics of a Proximity Sensor

A complete measurement of the characteristics of the sensor 102 at one temperature and with the target 110 at a specified distance from the sensor 102 consists of the sensor admittance at two frequencies, as described above: G1, B1, G2, and B2.

To create a comprehensive database that describes the characteristics of the sensor 102 for all conditions, G1, B1, G2, and B2 are measured for a plurality of gaps 108 between the sensor 102 and the target 110, and for a plurality of operating temperatures. The resulting database will be four two-dimensional tables, which, if interpolated, will provide information pertaining to the conductance G, the susceptance B, the temperature, and the separation distance between the sensor 102 and the target 110. According to one embodiment of the present invention, measurements of the parameters described above may be made using the measurement circuitry 120 shown in FIG. 2, with the cable 104 removed so that the sensor 102 is directly connected to the measurement circuitry 120.

The observed admittance values (with the cable included) may be derived from the operating point of the sensor 102 and parameters of the cable 104. More importantly, when only the admittance values are known, the operating point of the sensor 102 and parameters of the cable 104 may be determined. From the operating point of the sensor 102, a desired sensor characteristic, such as the gap 108, is determined.

To illustrate how the characteristics of the sensor 102 may be determined if the sensor admittance attributes G1, B1, G2, and B2 and the measured admittance attributes (including effects from the cable 104) are known, it will first be shown how the sensor admittance may be determined if the sensor characteristics (and cable characteristics) are known. The reverse problem will then be addressed.

If only the sensor characteristics (the operating point) of the sensor 102 are known, the sensor admittance values G1, B1, G2, and B2 may be determined by accessing a database, such as the sensor characteristics database 122 shown in FIGS. 1 and 2. The admittance of the sensor/cable assembly may then be determined by substituting the determined sensor admittance values into Equation (1).

$$Y_{IN} = Y_O Y_L + \frac{Y_O \tanh(\gamma \cdot \text{Length})}{Y_O + Y_L \tanh(\gamma \cdot \text{Length})} \quad \text{Equation (1)}$$

In Equation (1), $Y_{IN}$ is the admittance of the sensor/cable assembly, $Y_L$ is the admittance of the sensor (i.e. G1+jB1 or G2+jB2), Length is the length of the cable, and gamma ($\gamma$) and the characteristic admittance ($Y_o$) are as set forth in Equations (2) and (3), respectively.

$$\gamma = \sqrt{(R + j\omega L)(G + j\omega C)} \quad \text{Equation (2)}$$

$$Y_O = \sqrt{\frac{G + j\omega C}{R + j\omega L}} \quad \text{Equation (3)}$$

In Equations (2) and (3), omega ($\omega$) is the frequency (in rads/sec), R is the resistance per meter of the cable, L is the inductance per meter of the cable, G is the conductance per meter of the dielectric (which is negligible in the preferred embodiment), and C is the capacitance per meter of the cable. The values of R, L, and C depend on the type of wire that is used. The value of R is also dependent on the temperature of the wire. For many applications, such as for use on aircraft, the type of wire will be known, and thus C and L are not likely to vary appreciably.

Equations (1), (2), and (3) and the accompanying description illustrate how the sensor admittance and sensor/cable assembly admittance may be determined if the sensor and cable characteristics are known. In a practical application, however, the reverse situation is likely to occur: the sensor characteristics are not known, and instead must be determined. According to various embodiments of the present invention, the sensor characteristics are determined by talking admittance measurements and making estimates of sensor and cable parameters to determine which estimates give values of admittance that approach the measured admittance values. An iterative convergence technique is used, in conjunction with one or more databases, such as the sensor characteristics database 122 and the inverse sensitivity matrices database 128.

Figure 3:
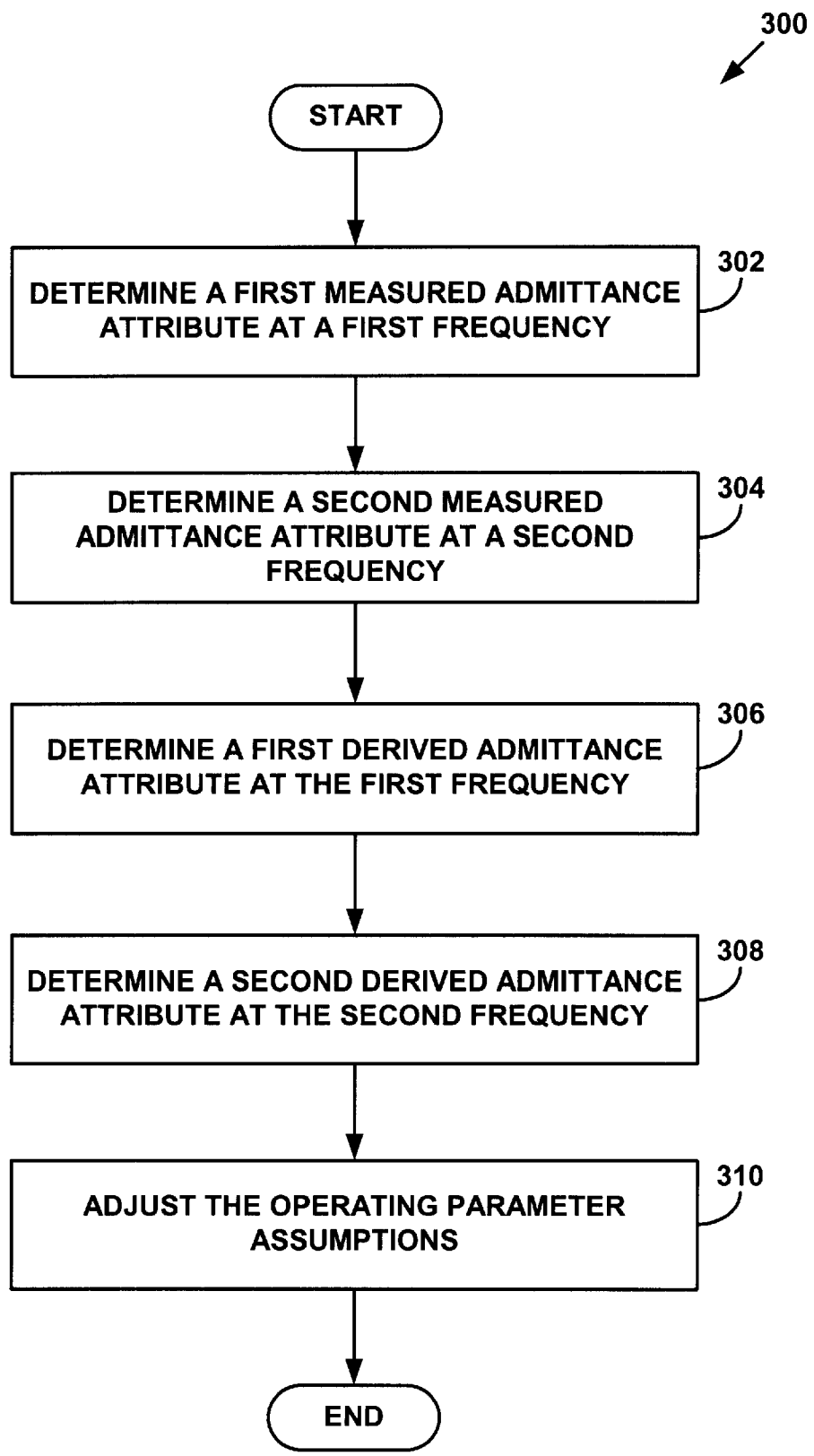
FIG. 3 is a simplified flow diagram illustrating a method for determining characteristics of a proximity sensor, according to an embodiment of the present invention.

FIG. 3 is a flow diagram illustrating a method 300 for determining parameters of a proximity sensor attached to a cable, according to an embodiment of the present invention. For example, the proximity sensor may be the sensor 102 and the cable may be the cable 104, shown in FIGS. 1 and 2. In step 302, a first measured admittance attribute is determined at a first frequency. In step 304, a second measured admittance attribute is determined at a second frequency. In step 306, a first derived admittance attribute, corresponding to the first frequency, is determined using operating parameter assumptions. In step 308, a second derived admittance attribute, corresponding to the second frequency, is determined using operating parameter assumptions. In step 310, the operating parameter assumptions are adjusted to improve agreement between the measured admittance attributes and the derived admittance attributes.

The first measured admittance attribute refers to G1' and B1', the admittance of the sensor/cable assembly at a first frequency. The second measured admittance attribute refers to G2' and B2', the admittance of the sensor/cable assembly at the second frequency. The first measured admittance attribute and the second measured admittance attribute may be determined by using the measurement circuitry 120 shown in FIG. 2.

To determine the first and second derived admittance attributes, operating parameter assumptions are made. In one embodiment of the present invention, it is initially assumed that all of the operating parameters are in the middle of their potential ranges. For example, the operating parameter assumptions may include sensor parameter assumptions and cable parameter assumptions. The sensor parameter assumptions may include a gap parameter assumption and a temperature parameter assumption. The cable parameter assumptions may include a length parameter assumption and a resistance parameter assumption. Thus, if a mid-range assumption is made, the gap parameter assumption may be an intermediate distance between no separation and the maximum measurable separation (e.g. 0.0 millimeters to 6.0 millimeters). The temperature parameter assumption may equal an intermediate temperature between the lowest typical operating temperature and the highest typical operating temperature for a particular application (e.g. −50° C. to 80° C.). The length parameter assumption may equal an intermediate cable length between an extremely short cable (or no cable) and the maximum allowable cable length (e.g. 0 meters to 80 meters). The resistance parameter assumption may equal an intermediate resistance between observable minimum and maximum resistance values as effected by temperature and the type of wire used in the cable (e.g. 0 Ω to 18 Ω). The operating parameters assumptions may be optimized for the particular application involved.

In one embodiment of the present invention, operating parameter assumptions are stored in the assumptions database 126, for efficient access by the processor 116 in determining the first and second derived admittance attributes. Once the operating parameter assumptions have been made, the first and second derived admittance attributes may be determined. The admittance of the sensor 102 may be determined by accessing the sensor characteristics database 122 described with reference to FIG. 1. The sensor parameter assumptions (i.e., the gap parameter assumption and the temperature parameter assumption) may be used to locate the value of sensor admittance in each of the four tables of the sensor characteristics database 122, corresponding to the conductance G and the susceptance B at the first and second frequencies. The cable parameter assumptions (i.e., the length parameter assumption and the resistance parameter assumption) may be used in conjunction with equations (1), (2), and (3). The sensor admittance values derived from the sensor characteristics database 122 may be plugged into equations (1), (2), and (3) to obtain the first and second derived admittance attributes corresponding to the admittance of the sensor/cable assembly at two frequencies. Equations (1), (2), and (3) are solved for each of the first and second frequencies. The first and second derived admittance attributes will differ from the first and second measured admittance attributes if the operating parameter assumptions are incorrect. Closer correspondence between the measured admittance attributes and the derived admittance attributes may be obtained by adjusting the operating parameter assumptions.

Figure 4:
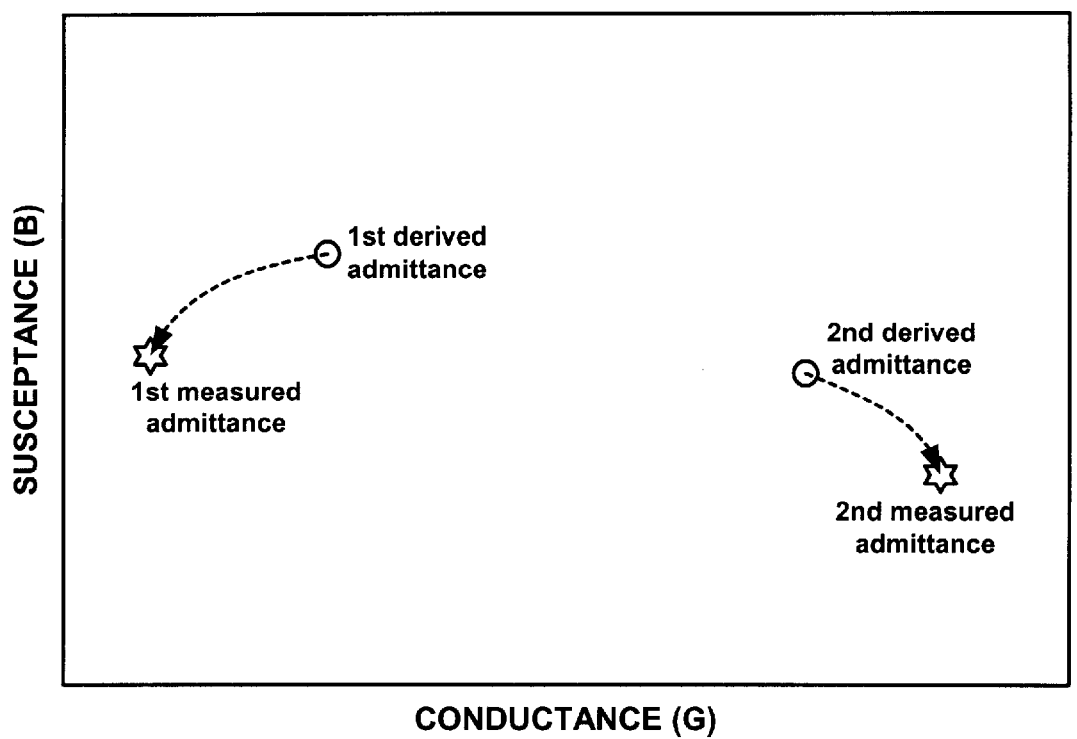
FIG. 4 a simplified convergence diagram illustrating a method for determining characteristics of a proximity sensor, according to an embodiment of the present invention.

FIG. 4 illustrates how the first measured admittance attribute may differ from the first derived admittance attribute and how the second measured admittance attribute may differ from the second derived admittance attribute. The dotted-line arrow shows a path from the derived admittance attributes to the measured admittance attributes. Such a path may be traversed during multiple iterations, in which operating parameter assumptions are updated to provide better correspondence between the derived admittance attributes and the measured admittance attributes. The convergence paths shown in FIG. 4 are merely illustrative, and are not intended to illustrate actual convergence paths traversed from iterative determinations of the derived admittance attributes.

To update the operating parameter assumptions, it should first be recognized that changing the sensor's temperature affects the admittance values in directions that are different from changes that occur in the gap 108. Changing the temperature of the cable 104 influences the admittance values in still different ways, as does changing the resistance of the cable 104. By comprehensively evaluating the sensitivity of G1', B1', G2', and B2' to changes in the temperature of the sensor 102, the gap 108, the resistance of the cable 104, and the length of the cable 104, a sensitivity matrix A having 16 entries may be obtained. If a vector X, representing changes in the operating parameter assumptions, is defined, and if a vector Y, representing the differences in admittance values at the two frequencies is also defined, we obtain the matrix equation AX=Y. shown below as Equation (4):

$$\begin{bmatrix} \frac{d}{dL}G'_1 & \frac{d}{dR}G'_1 & \frac{d}{dT}G'_1 & \frac{d}{dGap}G'_1 \\ \frac{d}{dL}B'_1 & \frac{d}{dR}B'_1 & \frac{d}{dT}B'_1 & \frac{d}{dGap}B'_1 \\ \frac{d}{dL}G'_2 & \frac{d}{dR}G'_2 & \frac{d}{dT}G'_2 & \frac{d}{dGap}G'_2 \\ \frac{d}{dL}B'_2 & \frac{d}{dR}B'_2 & \frac{d}{dT}B'_2 & \frac{d}{dGap}B'_2 \end{bmatrix} \cdot \begin{bmatrix} \Delta L \\ \Delta R \\ \Delta T \\ \Delta Gap \end{bmatrix} \Rightarrow$$

Equation (4)

$$\begin{bmatrix} G'_{M,f1} - G'_{D,f1} \\ B'_{M,f1} - B'_{D,f1} \\ G'_{M,f2} - G'_{D,f2} \\ B'_{M,f2} - B'_{D,f2} \end{bmatrix}$$

In equation 4, the first column of the sensitivity matrix A includes entries representing the sensitivity of the admittance as a function of cable length. The second column of the sensitivity matrix A represents the sensitivity of admittance as a function of the cable resistance. The third column of the sensitivity matrix A represents the sensitivity of the admittance as a function of the sensor temperature. The fourth column of the sensitivity matrix A represents the sensitivity of the admittance as a function of the gap. The four rows of the sensitivity matrix A correspond respectively to conductance at the first frequency, susceptance at the first frequency, conductance at the second frequency, and susceptance at the second frequency. The vector X represents changes in the operating parameter assumptions. ÄL refers to a change in cable length. ÄR refers to a change in cable resistance. ÄT refers to a change in sensor temperature. ÄGap refers to a change in the gap 108. The vector Y refers to differences in the admittance values at the two frequencies. For example, $G'_{M,f1} - G'_{D,f1}$ refers to the conductance derived at the first frequency subtracted from the conductance measured at the first frequency.

Equation (4) shows how if admittance values are derived from assumptions and if measured admittance values are known, changes in assumptions can be made to move from the derived admittance attributes to the measured admittance attributes. Because the changes in the four operating parameters affect the derived admittance attributes in different ways, only one combination of the four operating parameters will provide the correct answer to the equation. However, because the vector X is not known and is instead what is being determined, the equation $A^{-1}Y = X$ must be solved. Equation (5) represents this equation:

$$\begin{bmatrix} \frac{d}{dL}G'_1 & \frac{d}{dR}G'_1 & \frac{d}{dT}G'_1 & \frac{d}{dGap}G'_1 \\ \frac{d}{dL}B'_1 & \frac{d}{dR}B'_1 & \frac{d}{dT}B'_1 & \frac{d}{dGap}B'_1 \\ \frac{d}{dL}G'_2 & \frac{d}{dR}G'_2 & \frac{d}{dT}G'_2 & \frac{d}{dGap}G'_2 \\ \frac{d}{dL}B'_2 & \frac{d}{dR}B'_2 & \frac{d}{dT}B'_2 & \frac{d}{dGap}B'_2 \end{bmatrix}^{-1} \quad \text{Equation (5)}$$

$$\begin{bmatrix} G'_{M,f1} - G'_{D,f1} \\ B'_{M,f1} - B'_{D,f1} \\ G'_{M,f2} - G'_{D,f2} \\ B'_{M,f2} - B'_{D,f2} \end{bmatrix} \Rightarrow \begin{bmatrix} \Delta L \\ \Delta R \\ \Delta T \\ \Delta Gap \end{bmatrix}$$

The inverse sensitivity matrix $A^{-1}$ is stored in a database, such as the inverse sensitivity matrices database 128 for use with Equation (5). When multiplied by vector Y, Equation (5) provides vector X, the adjustments to be made to the operating parameter assumptions. For example, the solution to Equation (5) may specify that the length parameter assumption needs to be adjusted by adding one meter to the length parameter assumption.

Due to non-linearities, the problem is preferably solved iteratively, using an inverse sensitivity matrix that is derived around the present set of operating parameter assumptions. Each time the inverse sensitivity matrix is used to derive a new solution, the derived admittance attributes moves closer to the measured admittance attributes, and thus the operating parameter assumptions are closer to the actual operating parameters. When the derived admittance attributes are within an accuracy threshold of the measured admittance attributes, the operating parameter assumptions may be used to provide the desired sensor characteristics (i.e., the gap and/or the sensor temperature). Alternatively, a predetermined number of iterations may be performed. In a preferred embodiment, four iterations are performed, so that Equation (5) is solved four times and the operating parameter assumptions are updated four times.

It is not necessary to derive inverse sensitivity matrices for the precise values of the operating parameter assumptions. For many applications, it may be sufficient to have a plurality (such as a couple hundred) matrices that cover the range of conditions expected for a particular application. If such a technique is used, then the closest inverse sensitivity matrix to the operating parameter assumptions may be used to assist in determining the updated operating parameter assumptions. The use of approximate inverse sensitivity matrices will effect the rate of convergence. The use of a finite number of inverse sensitivity matrices avoids having to calculate the inverse sensitivity matrices in real time, which may be more computationally efficient. As an alternative, the inverse sensitivity matrices may be calculated in real time.

In the above description, the relationship between the gap and the operating parameters (gap, sensor temperature, cable length, and cable resistance) was described as being not quite linear. The iteration technique used in calculating the parameters was set forth to address the nonlinear relationship. If gross non-linearities are involved, the convergence to the correct solution might not conform to the desired requirements, especially if only a small number of inverse sensitivity matrices are stored. A fundamental problem is that all of the admittance values are a very non-linear function of the gap. They change a great deal when the target is close to the sensor, but they change very little when the target is toward the maximum value in the range of measurement. This problem may be addressed by defining a new variable (the "warp") to replace. The susceptance is largely a linear function of the warp over the full range of gaps. There is a fixed relationship between the gap and the warp, so all of the values of gap in the database that describes the sensor can be replaced with the corresponding value of the warp. The entire problem is solved in the warp domain. The determined warp value may then be converted back to the gap.

Another factor to be considered is the resistance of the cable. In Equations (1) through (5), the cable resistance was used as a parameter, but the formula for gamma (γ) had a value of R that was actually the resistance per unit length. The use of this value of R may affect the results when the cable length is short. This problem may be addressed by using the total resistance instead of the resistance per unit length. To illustrate the solution, Equation (1) is reproduced as Equation (6):

$$Y_{IN} := Y_O \cdot \frac{Y_L + Y_O \cdot \tanh(\gamma \cdot \text{Length})}{Y_O + Y_L \cdot \tanh(\gamma \cdot \text{Length})} \quad \text{Equation (6)}$$

It should be observed that a typical cable is very short compared to a wavelength even at a relatively high frequency of 6 KHz. Consequently, the value of gamma (γ) multiplied by the cable length is a small number. The value of the hyperbolic tangent function for numbers this small is approximately the same as the value of the argument of the function. Analysis reveals that only insignificant errors are introduced when the herbolic tangent function is ignored, resulting in Equation (7):

$$Y_{IN} := Y_O \cdot \frac{Y_L + Y_O \cdot (\gamma \cdot \text{Length})}{Y_O + Y_L \cdot (\gamma \cdot \text{Length})} \quad \text{Equation (7)}$$

By multiplying Equation (7) by $1/Y_o$, Equation (8) is obtained:

$$Y_{IN} := \frac{Y_L + Y_O \cdot (\gamma \cdot \text{Length})}{1 + \frac{Y_L}{Y_O} \cdot (\gamma \cdot \text{Length})} \quad \text{Equation (8)}$$

This can be farther simplified this by noting that $Y_o$ multiplied by gamma ($\gamma$) is the same as $j\omega$ C1 (because G is zero) and $\gamma/Y_o$ is the same as R1+j$\omega$L1, resulting in Equation (9):

$$YIN := \frac{YL + (j\omega \cdot C1) \cdot \text{length}}{1 + YL \cdot (R1 + j\omega \cdot L1) \cdot \text{length}} \quad \text{Equation (9)}$$

If a new parameter (Res) is defined to denote the resistance per unit length multiplied by the length (R1·length), Equation (10) is obtained:

$$YIN := \frac{YL + (j\omega \cdot C1) \cdot \text{length}}{1 + YL \cdot Res + YL \cdot \text{length} \cdot j\omega \cdot L1} \quad \text{Equation (10)}$$

In Equation (10), the parameters associated with the cable are the length and the resistance. Besides addressing the issue of short cable lengths, gamma ($\gamma$), $Y_o$, and the square roots have been removed, resulting in a solution that is computationally more efficient. For proximity sensor electronics having limited processing capabilities, a computationally efficient solution is typically desired.

Preferred and alternative embodiments of the present invention have been illustrated and described. It will be understood, however, that changes and modifications may be made to the invention without deviating from its true spirit and scope. The true spirit and scope of the invention is defined by the following claims.

We claim:

1. A method for determining parameters of a proximity sensor attached to a transmission cable, comprising in combination:
   determining a first measured admittance attribute at a first frequency;
   determining a second measured admittance attribute at a second frequency;
   determining a first derived admittance attribute corresponding to the first frequency, wherein the first derived admittance attribute is determined using operating parameter assumptions, and wherein the operating parameter assumptions include sensor parameters and cable parameters;
   determining a second derived admittance attribute corresponding to the second frequency, wherein the second derived admittance attribute is determined using the operating parameter assumptions; and
   adjusting the operating parameter assumptions until the first and second derived admittance attributes are within an accuracy threshold of the first and second measured admittance attributes.

2. The method of claim 1, wherein the sensor parameters comprise:
   a temperature parameter corresponding to a temperature of the proximity sensor; and
   a gap parameter corresponding to a separation between the proximity sensor and a target object.

3. The method of claim 2, wherein the cable parameters comprise:
   a length parameter corresponding to a length of the cable; and
   a resistance parameter corresponding to an electrical resistance of the cable.

4. The method of claim 1, wherein the first frequency is approximately two kilohertz, and wherein the second frequency is approximately six kilohertz.

5. The method of claim 1, wherein the operating parameter assumptions are updated three times, and wherein the first and second derived admittance attributes are determined four times.

6. A method for determining parameters of a proximity sensor attached to a cable, comprising in combination:
   determining a first measured admittance attribute at a first frequency;
   determining a second measured admittance attribute at a second frequency;
   determining a first derived admittance attribute corresponding to the first frequency, wherein the first derived admittance attribute is determined using operating parameter assumptions from a range of potential operating parameters;
   determining a second derived admittance attribute corresponding to the second frequency, wherein the second derived admittance attribute is determined using the operating parameter assumptions from the range of potential operating parameters;
   multiplying an inverse sensitivity matrix with a difference vector to determine operating parameter assumption adjustments; and
   applying the operating parameter assumption adjustments to the operating parameter assumptions to obtain adjusted operating parameter assumptions.

7. The method of claim 6, wherein the inverse sensitivity matrix is associated with the operating parameter adjustments, and wherein the difference vector includes entries corresponding to the difference between the first and second measured admittance attributes and the first and second derived admittance attributes.

8. The method of claim 6, further comprising:
   determining updated first and second derived admittance attributes using the adjusted operating parameter assumptions; and
   repeating the steps of multiplying the inverse sensitivity matrix and applying the operating parameter assumption adjustments.

9. The method of claim 8, wherein the steps of multiplying the inverse sensitivity matrix and applying the operating parameter assumption adjustments are repeated until the first and second measured admittance attributes differ by no more than an accuracy threshold from the first and second derived admittance attributes.

10. The method of claim 6, further comprising:
    determining updated first and second derived admittance attributes using the adjusted operating parameter assumptions; and
    repeating at least three times the steps of multiplying the inverse sensitivity matrix and applying the operating parameter assumption adjustments.

11. The method of claim 6, wherein the sensor parameters comprise:

a temperature parameter corresponding to a temperature of the proximity sensor; and a gap parameter corresponding to a separation between the proximity sensor and a target object.

12. The method of claim 6, wherein the cable parameters comprise:

a length parameter corresponding to a length of the cable; and a resistance parameter corresponding to an electrical resistance of the cable.

13. A system for determining characteristics of a proximity sensor for use in a proximity sensor/cable assembly, comprising in combination:

a proximity sensor;

a transmission cable;

a sensor characteristics database including sensor admittance data taken at two frequencies for a plurality of sensor temperatures and gap distances;

an inverse sensitivity database including entries corresponding to inverse relationships between sensor/cable assembly admittance and operating parameters; and a processor operable to determine updated operating parameter assumptions from the sensor characteristics database, the inverse sensitivity database, and initial operating assumptions.

14. The method of claim 13, wherein the sensor parameters comprise:

a temperature parameter corresponding to a temperature of the proximity sensor; and a gap parameter corresponding to a separation between the proximity sensor and a target object.

15. The method of claim 13, wherein the cable parameters comprise:

a length parameter corresponding to a length of the cable; and a resistance parameter corresponding to an electrical resistance of the cable.

* * * * *